United States Patent [19]
Tomka

[11] Patent Number: 6,117,925
[45] Date of Patent: Sep. 12, 2000

[54] THERMOPLASTIC PROCESSABLE STARCH OR STARCH DERIVATIVE POLYMER MIXTURES

[75] Inventor: Ivan Tomka, Zollikon, Switzerland

[73] Assignee: Bio-Tec Biologische Naturverpackungen GmbH & Co. KG, Germany

[21] Appl. No.: 09/242,151

[22] PCT Filed: Jul. 23, 1997

[86] PCT No.: PCT/IB97/00915

§ 371 Date: Feb. 25, 1999

§ 102(e) Date: Feb. 25, 1999

[87] PCT Pub. No.: WO98/06755

PCT Pub. Date: Feb. 19, 1998

[30] Foreign Application Priority Data

Aug. 9, 1996 [CH] Switzerland ............................. 1965/96

[51] Int. Cl.$^7$ ................ C08B 31/04; C08L 3/06
[52] U.S. Cl. ................ 524/47; 525/54.2; 525/54.22; 525/54.24; 525/54.26; 525/54.3

[58] Field of Search ............................... 524/47; 525/54.2, 525/54.22, 54.24, 54.26, 54.3

[56] References Cited

U.S. PATENT DOCUMENTS 5,540,929 7/1996 Narayan et al. .

FOREIGN PATENT DOCUMENTS

| 0596437 | 5/1994 | European Pat. Off. . |
| 4-173868 | 6/1992 | Japan . |
| 95/25750 | 9/1995 | WIPO . |
| 96/20220 | 7/1996 | WIPO . |

*Primary Examiner*—Nathan M. Nutter
*Attorney, Agent, or Firm*—Workman, Nydegger & Seeley

[57] ABSTRACT

The present invention relates to thermoplastically processible esterification or transesterification products of starch or of starch derivatives with, for example, lactones, fatty acids, esteramides and the like, wherein the starch or the starch derivative is brought to melt using appropriate softeners or plasticizers before esterification or transesterification.

22 Claims, No Drawings

THERMOPLASTIC PROCESSABLE STARCH OR STARCH DERIVATIVE POLYMER MIXTURES

Applicant claims the benefit under 35 U.S.C. § 120 of earlier filed International Patent Application No. PCT/IB97/00915, filed Jul. 23, 1997, pursuant to 35 U.S.C. §§ 363 and 371. Applicant also claims the benefit under 35 U.S.C. § 119 of earlier filed Swiss Application No. 1965/96, filed Aug. 9, 1996. For purposes of disclosure, the foregoing applications are incorporated herein by specific reference.

BACKGROUND OF THE INVENTION

1. Field of the Invention

The present invention relates to a process for preparing thermoplastically processible starch polymer mixtures or starch derivative mixtures according to the preamble of claim 1 and to a number of uses.

The present invention in particular relates to thermoplastically processible transesterification products of starch or derivatives thereof with, for example, lactones, esteramides, fatty acids, etc. and/or polyesters or other biologically degradable hydrophobic polymers and mixtures of transesterification products with the above-mentioned polymers. Their use is based on the fact that numerous types of starch, as macromolecular raw materials, are cheaper than the known thermoplastic materials.

Additionally, the present invention relates to processes for preparing the transesterification products of starch or derivatives, such as, in particular, starch acetates.

2. The Relevant Technology

Thermoplastically processible blends of starch have been described in WO 90/05161. Thermoplastically processible blends of starch, of softeners and of water-insoluble polymers display only limited uptake of water and have useful mechanical strength, but they are not storable at any level of surrounding humidity in the long term.

In addition, in JP 05 125 101, transesterification products of starch have been described which melt in the temperature range of from 150 to 170° C.; however, these products are unsuitable for wide use owing to their water uptake from the surrounding air and their poor mechanical properties. The preparation of these products by the known processes is prohibitive for wide use.

BRIEF SUMMARY OF THE INVENTION

The present invention, accordingly, proposes mixtures of transesterification products of starch or derivatives thereof with low-molecular-weight lactones, esteramides, fatty acids, etc., and oligomeric esters, polyesters and other hydrophobic biologically degradable polymers. At the phase boundaries between the transesterification products and, for example, the polyester, these mixtures show no preferred cracking on deformation and good stability of the mechanical properties on storage, and additionally they do not release any low-molecular-weight substances on contact with moisture.

The present invention additionally relates to a process for preparing transesterification products of starch or derivatives, such as, in particular, starch acetates with, for example, lactones and/or polyesters in the presence of transesterification catalysts.

Transesterification products of starch with low-molecular-weight lactones, such as dilactide, caprolactone (CL) or diglycolide are known. Also known are transesterification products of starch and polyesters, such as polycaprolactone (PCL). The polyester component may additionally be a copolyester, for example constructed from terephthalic acid, adipic acid, ethylene glycol and butanediol or from oligomeric esters of ethylene glycol and terephthalate, transesterified with caprolactone. However, the polyesters used have to be meltable in a temperature range of from 60 to 200° C.

DETAILED DESCRIPTION OF THE PREFERRED EMBODIMENTS

The present invention describes transesterification products of starch or of starch derivatives which can be processed with suitable polyesters and other biologically degradable hydrophobic polymers to give thermoplastically processible mixtures having useful properties. Such mixtures consist of a disperse phase of the esterification or transesterification product of the starch and a continuous phase of the polyester or the hydrophobic, biologically degradable polymer. To be able to achieve suitable mechanical properties and storage stability of the mixture at various levels of surrounding humidity, macromolecular components are required whose molecules bridge the phase boundaries between the disperse and the continuous phase. If such so-called compatibilizers are not incorporated into the mixture in sufficient amounts, thermoplasts having set breaking points at the phase boundaries are formed. It is a feature of the present invention that the compatibilizers are advantageously formed at the phase boundaries which are already present, that is to say that, if the compatibilizers are added to the mixture of starch ester and polyester or hydrophobic polymer, greater proportions of compatibilizers are required than otherwise. It is furthermore crucial that the polyester or copolymer substituents of the starch have the same chemical composition as the polyester or polymer component of the mixture or a chemical composition which is similar thereto. This ensures miscibility of the polyesters or polymers. Furthermore, it has been found that, for example, the transesterification products of starch with low-molecular-weight lactones and polyesters have considerably lower strength than the polyphase mixtures just described. This is the case even when both incorporate the same proportions of macromolecular polyesters; in the second case in the form of free macromolecules and a much lower proportion in the form of block copolymers, in the first case exclusively in the form of block copolymers.

Thus, according to a first aspect of the present invention, mixtures of polyesters and transesterification products of starch or of starch derivatives are proposed. On average, the molecules of the transesterification products are constructed as follows: from 0.4 to 0.6 parts by weight of starch radicals, from 0.6 to 0.4 parts by weight of low-molecular-weight ester radicals and from 0.01 to 0.05 parts by weight of high-molecular-weight ester radicals.

In the present invention, particular attention was paid to the preparation process. The starch is transesterified using partially or completely molten starch or molten starch derivatives, such as, in particular, starch acetates. Hardly any of the known solvents or swelling agents for the starch which are required as additives for melting the starch can be removed by simple methods such as volatilization from the reaction mixture after the reaction has ended. Water or formic acid, for example, are an exception here. However, in competition with the starch, water also reacts with the transesterifying agents. The water is therefore only allowed to remain in the system until a certain low degree of transesterification of the starch has been reached, and it is subsequently removed by volatilization. At this point, the starch is already present as transesterification product, and it is partially or completely molten at the temperature of the reaction mixture after the removal of the water. The transesterification of the starch reaches a degree of substitution of from 0.8 to 1, i.e. on average from 0.8 to 1 of the three hydroxyl groups of the anhydroglucose unit in the starch molecule are esterified.

An essential feature of the process according to the invention is the mixing of the reaction mixture to shorten the required diffusion paths of the molecular reaction partners. Furthermore the starch or the derivative, unless directly meltable, should be melted with the least possible amount of water, for example. These processes and the volatilization of the reaction material at the appropriate time can advantageously be carried out in a continuously operated kneader, for example a twin-screw kneader having corotating screws. The screw elements are advantageously exchangeable; the melting process of the starch requires kneader elements, the volatilization requires compression and decompression elements and the reduction of the length of the molecular diffusion paths requires mixing elements.

According to a further embodiment, it is proposed to bring the starch or derivatives thereof into the melt using formic acid, and to react them subsequently with lactones, such as, in particular, caprolactone. Here, the amount of water of the starch can be varied from virtually dry starch to about 25% by weight. However, the water content of the original starch is preferably at most 10%, preferably 2–5%. The properties of the starch polymer mixture, such as, in particular, the starch formate hydroxycaproate formed can be influenced by the proportion of water. Thus, the higher the water content, the more formate is formed, and correspondingly, the lower the water content, the more caproate is formed. The thermoplastic processibility is the better the more caprolactone is reacted. In contrast, if more formic acid is reacted, the resistance to water is better. Here also, it is true that the water or the formic acid has to be stripped from the reaction mixture at least partially after a certain degree of substitution of the basic molar unit of the starch has been reached.

Using this last-mentioned course of the reaction, it is possible to replace a certain proportion of caprolactone, which is still relatively expensive; however, this is only possible to the extent to which a reduction of the thermoplastic processibility is acceptable.

Again according to a further embodiment of the invention, it is proposed to employ, instead of starch, a starch acetate which is meltable in principle without adding an additional softener or plasticizer. Respectively, it is possible to incipiently swell a starch acetate directly by means of the transesterification reaction partner or to bring it into a meltable state, as is possible, for example, by adding a lactone, such as, for example, caprolactone. By using starch acetates, it is possible to carry out the reaction homogeneously, i.e. without using an additional solvent, such as, for example, water or formic acid, as is imperative if pure starch is employed.

A further advantage of using starch acetates consists in the fact that this class of compounds, such as, in particular, starch diacetate, is readily commercially available, and at reasonable prices. Thus, for example, starch diacetates which have a degree of substitution in an order of magnitude of 1.9–2.3 and which on their own can hardly be melted, but which can be melted together with caprolactone in a temperature range <200° C., thus making transesterification possible, can be obtained easily. In contrast, pure starch together with caprolactone cannot be melted, owing to which in the latter case addition of a solvent or softener is always required.

Esterification or transesterification products of starch or of starch derivatives proposed according to the invention are suitable for mixing with a number of other polymers, and the presence of these esterification or transesterification products ensures the miscibility of the starch or of starch derivatives with additional polymers. As mentioned at the outset, these esterification or transesterification products serve in this case as compatibilizers. However, these esterification or transesterification products can also be used on their own as thermoplastically processible polymers.

Here, starch or the esterification or transesterification product is preferably mixed with hydrophobic biologically degradable polymers, such as, for example, polyesters, copolyesters with aliphatic and aromatic blocks, polyesteramides, polyesterurethanes, polyvinyl alcohol, ethylenevinyl alcohol and/or mixtures thereof. Particularly suitable are polycaprolactone, polylactides, polyhydroxybutyric acid and also copolymers with valeric acid and/or polyesters prepared by fermentation.

Other biologically degradable polymers suitable for use as mixture components are natural polymers, such as gelatin, lignin, cellulose, derivatives of the above-mentioned materials and/or mixtures thereof.

Furthermore, it is possible to add fillers, fibers and other additives to these polymer mixtures, as is generally customary in the plastics- or polymer-processing industry.

The invention is now illustrated using the enclosed examples, but these examples are only intended to explain the present invention more clearly, and not to limit the present invention.

EXAMPLE 1

5 kg of starch, 1.5 kg of water, 5 kg of caprolactone (CL) and 0.25 kg of 1,8-diazabicyclo(5.4.0)undec-7-ene (DBU) are melted and extruded in a twin-screw extruder with L/D=20 and D=46 mm, at 110° C. and a rotational speed of the screws of 50/minutes. The average dwelling time of the material in the extruder was 2.5 minutes. The extrusion process was repeated several times using the same material, in each case at the extruder temperatures: 110, 120, 140 and 160° C. After these transits, the material was volatilized at 180° C. in the next transit and five transits were subsequently carried out at 180° C. The extrudate was extracted 4 times using dioxane. The dioxane solution contained the unreacted CL, the PCL and the DBU. The ratio by mass of the CL which had been esterified with starch to the CL originally employed was 0.25 after the 5th transit and 0.87 after the 11th transit. The dioxane solution contained no PCL. The proportion of CL in the purified transesterification product was determined using $^1$H NMR spectroscopy in $d_6$-dimethyl sulfoxide solution at 80° C. and IR spectroscopy and was 0.2 parts by mass after the 5th transit and 0.47 parts by mass after the 11th transit.

The transesterification product having a proportion of 0.47 parts by mass of CL was reacted as above, but in only 3 transits at 180° C., with PCL in a mass ratio of 1:1. The proportion of PCL in the new transesterification product was 0.02 parts by mass.

This product contained 0.48 parts by mass of unreacted PCL and was examined for strength in a simple tensile test at 20° C. and a take off speed of 10 cm/minute. In all tests, the tension under pressure was >30 MPA. The water uptake at 20° C. and a water activity of 1 was 0.03 parts by mass of water after 20 hours.

EXAMPLE 2

In a further experiment, the method of Example 1 was used, but volatilization was carried out after two transits at 160° C., and the procedure of experiment 1 was then followed. Within the margin of error of the methods, the analytical results and the properties of the end product were identical.

EXAMPLE 3

Experimental

Native potato starch (25 g) ($H_2O$ content between 2 and 25%) was melted with formic acid (10 g) at 120° C. in a chamber kneader at 30 rpm. At a water content of 9%, 2 tests were carried out to investigate the reproducibility of the results. After 5 min, caprolactone (25 g) was added to the homogeneous clear melt. Samples were taken after 60 and 120 min and extracted with hot dioxane (3 times) to remove the unreacted acylating agent.

Results

The proportion of caprolactone or formide was determined at room temperature and at 80° C. using $^1H$ NMR. Owing to the ambiguous height of the integrals of the starch signals, a maximum value and a minimum value for the detected compound have been given.

The results are summarized in Tables 1 and 2.

TABLE 1

Determination of the degree of substitution (D.S.) at RT

| 300 K | CL content | | Formide content | |
| --- | --- | --- | --- | --- |
| $H_2O$ content | D.S. max | D.S. min | D.S. max | D.S. min |
| 25 | 0.39 | 0.23 | 1.07 | 0.63 |
| 9 | 0.49 | 0.41 | 0.94 | 0.79 |
| 9 | 0.43 | 0.37 | 0.57 | 0.49 |
| 2 | 1.03 | 0.89 | 0.43 | 0.37 |

TABLE 2

Determination of the degree of substitution (D.S.) at 80° C.

| 353 K | CL content | | Formide content | |
| --- | --- | --- | --- | --- |
| $H_2O$ content | D.S. max | D.S. min | D.S. max | D.S. min |
| 25 | 0.49 | 0.27 | 0.74 | 0.4 |
| 9 | 0.53 | 0.26 | 1.02 | 0.49 |
| 9 | 0.37 | 0.34 | 0.48 | 0.44 |
| 2 | 0.89 | 0.66 | 0.38 | 0.28 |

From the test results, the following is evident:

1. The caprolactone content increases exponentially with a decrease of the water.

2. The proportion of formate decreases slightly with a decreasing amount of water.

Discussion

The observations made under points 1. and 2. can be explained as follows: the increase of the proportion of caprolactone with simultaneous decrease of the proportion of water reflects the decrease of the irreversible hydrolysis of caprolactone which is determined by the amount of water.

Formic acid does not react with water in a side-reaction; thus, the amount of formic acid remains constant. Since caprolactone has a higher reactivity towards the hydroxyl groups of starch than formic acid, it reacts faster with the hydroxyl groups which are free for acylation, and it reduces the amount of hydroxyl groups available for the slower reaction with formic acid.

Although in each of the three preceding examples, caprolactone has been used as a reaction component in the esterification of the starch or the starch derivative, it is of course also possible to use other suitable esterification or transesterification partners to prepare a thermo-plastically processible starch polymer component or mixture. Thus, in principle, in addition to caprolactone or generally lactones, esters, esteramides, dimeric fatty acids, modified fatty acids, acid methyl esters, esterpolyols, glycerol trioleate and/or glycerol dilinoleate have proven to be suitable reaction partners. Also suitable are, of course, if appropriate, the polymers prepared from these monomers or oligomers, such as, for example, polyesterpolyol, polycaprolactone, polyesters prepared from the above-mentioned polyols and fatty acids, polyesteramides, etc.

In each case, it is essential that the starch or the starch derivative is brought to melt using suitable softeners or plasticizers prior to carrying out the esterification or transesterification reaction in question, and to remove the softener or plasticizer used, such as, for example, water or formic acid, at least partially, if appropriate, from the reaction mixture, for example by volatilization, when a certain degree of substitution of the basic molar units of the starch is reached.

This is not necessary if the softener or the plasticizer simultaneously acts as reaction partner which participates in the esterification or transesterification, for example of the starch derivative, as in the case of caprolactone in the appropriate incipient swelling of starch diacetate.

Finally, it is possible both to prepare appropriate molded articles, films or other extrudates directly from the esterification or transesterification products of starch or starch derivatives prepared according to the invention, and to mix these esterification or transesterification products initially with other, for example hydrophobic, biologically degradable polymers, such as, for example, polycaprolactone, to prepare appropriate molded articles, extrudates and the like from these polymer mixtures. Here, it is preferred to prepare the last-mentioned polymer mixture in one process step without first isolating the esterification or transesterification product and to introduce it once more into a plastification unit, such as an extruder.

We claim:

1. A method for manufacturing a thermoplastically processable polymer composition comprising:
   (a) blending at least one of starch or a starch derivative with at least one hydrophobic material selected from the group consisting of esters, lactones, polyesters, esteramides, polyesteramides, dimeric fatty acids, modified fatty acids, acid methyl esters, esterpolyols, polyesterpolyols, glycerol trioleate, glycerol dilinoleate, and mixtures thereof, and
   (b) mixing and heating the starch or starch derivative with the hydrophobic material in a manner so as to form a thermoplastic melt and in order for at least a portion of the starch or starch derivative to react with at least a portion of the hydrophobic material so as to form at least one condensation reaction product of the starch or starch derivative and the hydrophobic material and in order to thereby form the thermoplastically processable composition.

2. A method as defined in claim 1, wherein the starch derivative is a starch acetate.

3. A method as defined in claim 1, wherein the starch or starch derivative is reacted with formic acid and at least one lactone.

4. A method as defined in claim 1, wherein the starch or the starch derivative is processed so as to include from 0.02 to 0.5 parts by weight of water.

5. A method as defined in claim 1, wherein the thermoplastic melt has a temperature in a range of 80° to 200° C.

6. A method as defined in claim 1, wherein the starch or a starch derivative initially includes a water content of about 2 to 10% by weight and is initially brought to a melt together with formic acid, wherein the thermoplastic melt is reacted with caprolactone and wherein at least a portion of the water and at least a portion of any unreacted formic acid is stripped off by volatilization from the thermoplastic melt.

7. A method as defined in claim 1, wherein the starch or starch derivative comprises starch diacetate which is brought to a melt together with caprolactone, and wherein the starch diacetate and caprolactone are at least partially reacted using a suitable transesterification catalyst.

8. A method as defined in claim 1, wherein plastification work of from 0.05 to 0.4 kWh/kg is applied to the thermoplastic melt.

9. A method as defined in claim 1, wherein at least step (b) is carried out in a continuously operated kneader, twin-screw kneader/extruder, Buss cokneader and gear pump having a downstream static Sulzer mixer.

10. A method as defined in claim 1, wherein at least step (b) is carried out in a time period from 2 to 30 minutes.

11. A method as defined in claim 1, further including the step of combining at least one hydrophobic biologically degradable polymer with the condensation reaction product of the starch or starch derivative and the hydrophobic material, wherein the hydrophobic biologically degradable polymer is selected from the group consisting of aliphatic polyesters, polycaprolactone, polylactides, polyhydroxybutyric acid, copolymers of valeric acid, polyesters prepared by fermentation, copolyesters having aromatic and aliphatic blocks, polyesteramides, polyesterurethanes, polyvinyl alcohol, ethylenevinyl alcohol, and mixtures thereof.

12. A method as defined in claim 1, further including the step of combining at least one natural polymer with the condensation reaction product of the starch or starch derivative and the hydrophobic material, wherein the natural polymer is at least one of gelatin, lignin, cellulose, a derivative of at least one of the foregoing materials, or a mixture thereof.

13. A thermoplastically processable polymer composition comprising at least one condensation reaction product of starch or a starch derivative and a hydrophobic material selected from the group consisting of esters, lactones, polyesters, esteramides, polyesteramides, dimeric fatty acids, modified fatty acids, acid methyl esters, esterpolyols, polyesterpolyols, glycerol trioleate, glycerol dilinolate, and mixtures thereof.

14. A thermoplastically processable polymer composition as defined in claim 13, wherein the composition further includes at least one hydrophobic biologically degradable polymer combined with the at least one condensation reaction product of the starch or starch derivative and the hydrophobic material, wherein the hydrophobic biologically degradable polymer is at least one of an aliphatic polyester, a copolyester having aliphatic and aromatic blocks, a polyesteramide, a polyesterurethane, polyvinyl alcohol, ethylenevinyl alcohol, or a mixture of at least two of the above-mentioned polymers.

15. A thermoplastically processable polymer composition as defined in claim 13, wherein the composition further includes at least one natural polymer combined with the at least one condensation reaction product of the starch or starch derivative and the hydrophobic material, wherein the natural polymer is at least one of gelatin, lignin, cellulose, a derivative of at least one of the foregoing materials, or a mixture thereof.

16. A thermoplastically processable polymer composition as defined in claim 13, wherein the polymer composition further includes at least one of fillers, fibers or reinforcing materials.

17. A thermoplastically processable polymer composition as defined in claim 13, wherein the polymer composition further includes at least one of additives, softeners, pigments, or crosslinkers.

18. A thermoplastically processable polymer composition as defined in claim 13, wherein the condensation reaction product comprises up to 0.6 parts by weight of starch.

19. A thermoplastically processable polymer composition as defined in claim 13, wherein the polymer composition is at least one of a film, tube, or extrudate.

20. A thermoplastically processable polymer composition as defined in claim 13, wherein the polymer composition is at least one of a molded article or an injection-molded material.

21. A method as defined in claim 1, wherein the starch or starch derivative has a degree of substitution of basic molar units of starch of up to about 0.8 upon formation of the condensation reaction product.

22. A method as defined in claim 1, further including the steps of incorporating at least one of an additive, a softener, a pigment, or a crosslinker within the thermoplastic processable polymer composition and forming the composition into at least one of a film, tube, extrudate, molded article, or injection-molded material.

* * * * *

UNITED STATES PATENT AND TRADEMARK OFFICE
CERTIFICATE OF CORRECTION

PATENT NO. : 6,117,925
DATED : September 12, 2000
INVENTOR(S) : Ivan Tomka

It is certified that error appears in the above-identified patent and that said Letters Patent is hereby corrected as shown below:

Column 6,
Line 50, after "mixtures thereof" change the comma to a semi-colon

Signed and Sealed this

Sixth Day of November, 2001

Attest:

NICHOLAS P. GODICI
Attesting Officer   Acting Director of the United States Patent and Trademark Office